US006291568B1

(12) United States Patent
Lussey

(10) Patent No.: US 6,291,568 B1
(45) Date of Patent: Sep. 18, 2001

(54) POLYMER COMPOSITION

(75) Inventor: David Lussey, Richmond (GB)

(73) Assignee: Peratech Limited of a Company of Great Britain and Northern Ireland (GB)

( * ) Notice: Subject to any disclaimer, the term of this patent is extended or adjusted under 35 U.S.C. 154(b) by 0 days.

(21) Appl. No.: 09/355,028

(22) PCT Filed: Jan. 23, 1998

(86) PCT No.: PCT/GB98/00206

§ 371 Date: Jul. 22, 1999

§ 102(e) Date: Jul. 22, 1999

(87) PCT Pub. No.: WO98/33193

PCT Pub. Date: Jul. 30, 1998

(30) Foreign Application Priority Data

| | | |
|---|---|---|
| Jan. 25, 1997 | (GB) | 9701577 |
| Mar. 3, 1997 | (GB) | 9704389 |
| May 28, 1997 | (GB) | 9710844 |
| Aug. 18, 1997 | (GB) | 9717367 |
| Oct. 10, 1997 | (GB) | 9721401 |
| Oct. 24, 1997 | (GB) | 9722399 |

(51) Int. Cl.[7] ..... C08K 3/08

(52) U.S. Cl. ..... 524/413; 252/62.9 PZ; 252/518; 252/520; 524/431; 524/435; 524/493; 524/588

(58) Field of Search ..... 524/431, 413, 524/435, 493, 588; 252/62.9 PZ, 518, 520

(56) References Cited

U.S. PATENT DOCUMENTS 4,028,276 * 6/1977 Harden et al. .
5,686,158 * 11/1997 Gibbon .

* cited by examiner

*Primary Examiner*—Robert Dawson
*Assistant Examiner*—Kuo-Liang Peng
(74) *Attorney, Agent, or Firm*—Larson & Taylor, PLC

(57) ABSTRACT

A polymer composition is elastically deformable from a quiescent state. The composition includes at least one electrically conductive filler dispersed within and encapsulated by a non-conductive elastomer, the nature and concentration of the filler being such that the electrical resistivity of the composition is variable in response to distortion forces down to a value substantially equal to that of the conductor bridges of the filler. The composition further includes a modifier which, on release of the distortion forces, accelerates the elastic return of the composition to its quiescent state.

24 Claims, 5 Drawing Sheets

POLYMER COMPOSITION

TECHNICAL FIELD

This invention relates to a polymer composition, and more particularly to an elastomeric conductive polymer composition which displays a large dynamic resistance range and isotropic electrical properties when subjected to distortion forces such as compression or extension forces or alignments created by mechanical energy, thermal energy, electric fields or magnetic fields.

BACKGROUND ART

Devices for switching electric current are conventionally of a mechanical nature and as such embody a number of disadvantages, for example the generation of significant transients such as sparks on actuation of the switch.

It has been proposed to provide polymer compositions capable of providing a variable electrical conductivity effect.

DE 195 10 100 A1 discloses elastically moldable resistors which are either non-conductive in the quiescent state, becoming conductive on the application of pressure, or are conductive in the quiescent state, becoming less conductive under tension. Significantly high pressures of the order of 100 $Kgf/cm^2$ are required to decrease the resistance to 2–3 ohm/cm, such pressures being two orders of magnitude above human 'touch' pressure which is typically in the range of 300 to 600 $gf/cm^2$. Thus such devices are unsuitable for electrical switches relying on finger contact to change electrical resistance from open circuit to low resistance values.

DE 27 16 742 discloses pressure sensitive elastomer compositions that change electrical resistance from a semi-conducting state of typical resistivity $10^3$ ohms/cm to a low resistance state of typical resistivity 10 ohms/cm by the application of high pressures, typically 5–15 $Kgf/cm^2$. Again such materials are unsuitable for practical finger switching devices.

SUMMARY OF THE INVENTION

It would be desirable to be able to provide an improved polymer composition capable of directly carrying electric current, capable of operation with zero or minimal generation of transients, and capable of providing isotropic electrical properties when subjected to substantially lower forces than heretofore.

According to the present invention there is provided a polymer composition which is elastically deformable from a quiescent state and comprises at least one electrically conductive filler mixed with a non-conductive elastomer, characterised in that the volumetric ratio of filler to elastomer is at least 0.1:1 within the composition, the filler being mixed with the elastomer in a controlled manner whereby the filler is dispersed within and encapsulated by the elastomer and remains structurally intact, the nature and concentration of the filler being such that the electrical resistivity of the composition is variable in response to compression or extension forces and decreases from a given value in the quiescent state towards a value substantially equal to that of the conductor bridges of the filler when subjected to either compression or extension forces, the composition further comprising a modifier which, oa release of said forces, accelerates the elastic return of the composition to its quiescent state.

Such a composition, as well as being capable of carrying high currents and displaying a large dynamic electrical resistance range with electrical properties which are changed when the composition is subjected to either compression or extension forces or alignments, is capable of full recovery to the quiescent state when the forces are removed. The cycle may be repeated many times without deterioration of the property. It may also display piezo-charge properties when forces are applied and is capable of holding a charge when unstressed or lightly stressed prior to the commencement or completion of conduction. The polymer composition is produced by combining powdered forms of the metallic elements or their electrically conductive reduced oxides, either on their own or together, within an elastomer encapsulant under a controlled mixing regime.

Such an electrically conductive material is more specifically selected from the group consisting of titanium, tantalum, zirconium, vanadium, niobium, hafnium, aluminium, silicon, tin, chromium, molybdenum, tungsten, lead, manganese, beryllium, iron, cobalt, nickel, platinum, palladium, osmium, iridium, rhenium, technetium, rhodium, ruthenium, gold, silver, cadmium, copper, zinc, germanium, arsenic, antimony, bismuth, boron, scandium and metals of the lathanide and actinide series and at least one electroconductive agent. Alternatively, the conducting filler can be the basic element in the unoxidised state. An alternative conductive medium can be a layer of conducting element or oxide on a carrier core of powder, grains, fibres or other shaped forms. The oxides can be mixtures comprising sintered powders of an oxycompound.

The encapsulant elastomer will have the general properties:

i) low surface energy typically in the range 15–50 dyne/cm but especially 22–30 dyne/cm, ii) a surface energy of wetting for hardened elastomer higher than its uncured liquid, iii) a low energy of rotation (close to zero) giving extreme flexibility, iv) excellent pressure sensitive tack both to the filler particles and electrical contacts to which the composite may be attached—that is possess a high ratio of viscous to elastic properties at time spans comparable to bonding times (fraction of a second), v) high on the triboelectric series as a positive charge carrier (conversely will not carry negative charge on its surface), vi) chemically inert, fire extinguishing and effective as a barrier to oxygen and air ingress.

The silicone elastomers typically but not exclusively based on polydimethylsiloxane, with leaving groups, cross-linkers and cure systems based on:

| Leaving Group | Cross-Linker | Cure System |
|---|---|---|
| $HOC(O)CH_3$ | $CH_3Si[OC(O)CH_3]_3$ | ACETIC ACID |
| $HOCH_3$ | $CH_3Si(OCH_3)_3$ | ALCOHOL |
| $HONC(CH_3)$ $(C_2H_{5})$ | $CH_3Si$ $[ONC(CH_3)C_2H_5]_3$ | OXIME |

-continued

| Leaving Group | Cross-Linker | Cure System |
|---|---|---|
| $CH_3C(O)CH_3$ | $CH_3Si\ [OC(CH_2)CH_3]_3$ | ACETONE |
| $HN(CH_3)C(O)C_6H_5$ | $CH_3Si\ [N(CH_3)C(O)C_6H_5]_3$ | BENZAMIDE |

meet all of the above mentioned property criteria. The elastomer can be mixtures comprising cured elastomers selected from the group comprising one, two or more component silicones, one, two or more component polygermanes and polyphosphazines and at least one silicone agent. The preferred embodiment of the invention employs a product with useful strength, pressure sensitive tack and useful life and is manufactured from high strength room temperature cured fumed silica loaded (RTV) silicone polymer.

Other additives are included with the silicone for the purpose of modifying the physical and electrical properties of the uncured or cured polymer composition. Such additives can include at least one property modifier from the group comprising: alkyl and hydroxyalkycellulose, carboxymethylcellulose, hydroxyethylcellulose, hydroxypropylcellulose, polyacrylamide, polyethylene glycol, poly(ethylene oxide), polyvinyl alcohol, polyvinylpyrrolidone, starch and its modifications, calcium carbonate, fumed silica, silica gel and silicone analogues and at least one silica analogue or silicone analogue modifier. Fumed silica is an example of a modifier as commonly used in elastomer technology. For this invention, in proportions of between 0.01–20% by weight of the final polymer composition, it increases the resilience of the polymer composition to accelerate the return of the composition to its quiescent state after any applied force is released.

The ratio of conductive medium to encapsulated elastomer is in the order of 7:4 by volume. Small changes of this ratio will be required to account for the difference in relative surface tensions of different types and grades of elastomer and the various surface energies of the different conductive oxides and modifiers. Changes of this ratio also have an effect on the piezo-charge properties, the overall resistance range, the recovery hysteresis and the pressure sensitivity of the polymer composition. The limits of the described effects range from approximately 1:1 to 3:1 conductive medium to elastomer by volume. Mixtures in the region of 1:1 display smaller resistance changes for larger applied forces whilst mixtures in the region of 3:1 are, or are close to being fully conductive in the quiescent state and show extreme sensitivity to mechanically, electrically and thermally induced forces and alignments. Mixtures above the region of 3:1 can have upper resistance levels below $10^{12}$ ohms in the quiescent state.

Mixing the conductive filler, elastomer and modifier should be done with minimum force being applied to the mixture. A polythene mortar and pestle can be used for mixing small quantities of the polymer. The finished polymer composition can be extruded or pressed into sheet, pellet or fibre form or can be cast into moulds. It can be milled or cryogenically powdered. Energy imparted during mixing and moulding the polymer composition in the uncured state may effect the physical and electrical performance of the cured polymer composition. For example, it is possible to make the polymer composition with low electrical resistance levels or lower levels of conductive medium by maintaining a mechanical pressure on the constituents during the polymerization phase of manufacture. It is also possible to granulate the RTV based polymer forming a powder by rotary ablation of the polymer surface as polymerisation is proceeding. This process produces a powder containing a mix of particle sizes based on agglomerated and individual conductive filler particles coated with the elastomer encapsulant.

In the uncured state, the polymer composition can be spread onto conductive surfaces or tracks to provide an intimate electrical contact with the polymer composition once cured.

The silicone elastomers are typically but non-exclusively based on polydimethylsiloxane, polysilamine and allied silicone backbone polymers meeting criteria previously described with leaving groups, cross-linkers and cure systems that may be as follows:

| Leaving Group | Cross-Linker | Cure System |
|---|---|---|
| $HOC(O)CH_3$ | $CH_3Si[OC(O)CH_3]_3$ | ACETIC ACID |
| $HOCH_3$ | $CH_3Si(OCH_3)_3$ | ALCOHOL |
| $HONC(CH_3)\ (C_2H_5)$ | $CH_3Si\ [ONC(CH_3)C_2H_5]_3$ | OXIME |
| $CH_3C(O)CH_3$ | $CH_3Si\ [OC(CH_2)CH_3]_3$ | ACETONE |
| $HN(CH_3)C(O)C_6H_5$ | $CH_3Si\ [N(CH_3)C(O)C_6H_5]_3$ | BENZAMIDE |

These and other one or two component silicone systems are individually or in combination usable in the invention to provide a range of materials differing in elastomeric properties. A further embodiment of the invention employs HTV silicone filled with fumed silica to provide interstitial structure, useful strength, pressure tack and life, cross-linked at an elevated temperature in the presence of a peroxide or other catalyst, that may typically but not exclusively be 2,4 dichloro dibenzoyl peroxide. HTV products so produced have the advantage that they may be stored for prolonged periods in the uncured state prior to processing into sheet, rod, foam, fibre, press moulded or other forms.

The resulting flexible polymer compositions may display a piezo-charge effect and will change their inherent electrical resistance in response to both pressure and strain forces. Working resistance is around the range $10^{12}$ to $10^{-1}$ Ohms and the polymer composition has excellent current carrying capability, typically a 2 mm thick piece of the polymer on a heat-sink can control AC or DC currents of 3 A/cm$^2$. The initial application of pressure or force to the polymer compositions result in the generation of an electrostatic charge and increasing the pressure or force decreases the electrical resistance of the compositions. The polymer compositions are flexible and reassert themselves when the force or pressure is removed. As this occurs the electrical resistance will increase towards a quiescent value and a pronounced electrostatic charge will develop. The electrostatic effect can provide digital switching indications or provide a voltage source. The electrical resistance change can provide an analogue of the applied pressure or force. Alternatively, the resistance range can be used to provide digital switching especially but not essentially at its upper and lower limits. The highly sensitive versions of polymer compositions and polymer compositions brought close to conduction by applied force can be changed into a fully conducting state by applying an electrostatic charge to the composition typically that generated by a piezoelectric spark generator and greater than 0.5 kV.

The polymer composition consists of particles held within an elastomeric matrix. In this composite structure particles are of such a size distribution so as to provide for a close packed structure with interstitial particle infilling. Voids present in the bulk powder become infilled with elastomer during mixing and particles become set in close proximity during the curing process. In order to achieve this structural arrangement the elastomer will have a low surface energy relative to the powder phase and uncured liquid surface energy less than cured elastomer surface energy. Such polymer compositions will include silicones, polygermanes and polyphosphazines. In the stressed state the distortion takes place such that the average entrapped inter-particle distance decreases. For metal particles this corresponds to an increase in electrical conductivity, for other types of particle other effects may be generated (change in ferromagnetism, piezoelectricity, ionic conduction,etc.).

For metal filled materials over the transition from unstressed to stressed state, bulk conductivity will change from that of the elastomer to that of the entrapped particles. At a certain level of distortion the number of particle-to-particle open-circuit tracks result in a conductivity tending towards that of the bulk metal resistivity. Since this effect is ultimately related to distortion of the bulk composite structure and since the bulk material is highly elastomeric and therefore energy absorbing, low "metallic" conductivity may only be achieved for thin sections (less than 2 mm in lateral dimension) of the composite material or upon application of high external stress or strain or torque. Upon removal of external force the material reverts back to its original structure whereby entrapped particles are held apart within an elastic insulating network.

Surprisingly, the polymer composition described is capable of carrying significant electrical current. Up to 30 amps continuous load has been carried to date when in a compressed state. This unique property may be explained by the fact that in the compressed state conduction occurs principally through the metal bridges described above. So for the purpose of explaining conduction the materials are best described in terms of a heterogeneous mixture in which the insulative encapsulant dominates electrical property in the quiescent state; and tending towards that of the conductor bridges (having a local resistivity tending to that of the conductor typically 1–1000 microhm-cm),in the compressed state (typically having a bulk resistivity greater than 1 milliohm-cm). Electron conduction is further confined to the conductor filler by the inability of the encapsulant to hold negative "electron" charge (typically the encapsulant is the optimal positive triboelectric charge carrier). For fixed composition the statistical chance of bridge formation is directly related to composite thickness. Thus both the sensitivity to distortion and current carrying capability increase with reduction in thickness with the thinnest films limited by the filler size distribution. For the mixtures described below the filler size distribution will typically limit thickness to >10–40 microns.

By incorporation of zirconium particles (or other ionic conducting materials) into a silicone elastomer the bulk material composite structure may be made to conduct both electrons and, in the presence of gaseous oxygen, oxygen ions. By control of bulk material stress (for example by the incorporation of static or externally resonated "stress grids" into the bulk composition) conduction of electrons and oxygen may be made to occur in different planes or different parts of the bulk structure. Such properties may be of particular interest in the design of fuel cell systems. It has also been found that internal ohmic heating may effect the internal structure of the composite. So for example in compositions encompassing nickel as conductive filler, RTV silicone encapsulant and fumed silica skeletal modifier it is found that the differential expansion of the encapsulant relative to the conductor is of such proportion (typically encapsulant expands fourteen times faster than the conductor) that upon passage of high current sufficient to create ohmic heating then differential expansion alters the stress/strain versus resistance transition. This effect may be induced at low differential temperatures (typically less than 100° C.) This effect (which induces a positive temperature coefficient of resistance "PTC" in the composite phase) may be conveniently employed for the purpose of regulating current flow. Onset of PTC may be regulated by increasing or decreasing mechanical pressure on the polymer composition. Alternatively for compositions that have a low electrical resistance (typically <100 ohms) in the quiescent state ohmic heating switches by virtue of the PTC effect between conducting and insulating states in a composition that is under little or no compressive force. This effect allows these polymer compositions to be used as switches or fuses which switch sharply to a high resistance state in response to excess current and which, because of their elastomeric nature, will return to a conductive state without removal of power when the current flow returns to a set value. This PTC effect can also be used in self-regulating heating elements where heat levels can be set by applying mechanical pressure to keep the polymer composition close to its PTC point at the required temperature. The polymer composition will maintain a relatively steady temperature by cycling in and out of the PTC phase. The composition has wide temperature tolerance and good thermal conductivity.

A nickel powder used in the invention was INCO Type 287 which has the following properties: beads are on average 2.5–3.5 microns in cross-section., chains may be more than 15–20 microns in length. It is a filamentary powder with a three-dimensional chain-like network of spiky beads having a high surface area.

The sizes of the particles are substantially all under 100 microns, preferably at least 75% w/w being in the range 4.7 to 5.3 microns.

In a particular example, the particle size distribution (in microns and by weight) is as follows (in rounded % FIGS.): 2.4—3%, 3.4—5%, 4.7—7%, 6.7—10%, 9.4—11%, 13.5—12%, 19—15%, 26.5—15%, 37.5—11%, 53—8%, 75—4%, 107—below 1%

The composition may be usefully employed in association with the anode or cathode construction of an electrochemical cell based on lithium, manganese, nickel, cobalt, zinc, mercury, silver or other battery chemistry including organic chemistry. Either or both the electrodes may be exchanged or coated with the polymer composition to give the following advantages:

1. The cell could incorporate its own integral pressure switch which, for example, could be operated by the pressure normally used to hold the cell in place in the battery compartment. By this means, self-discharge or short circuiting of the cell could be reduced or eliminated whilst the cell was in an unstressed storage state.
2. The integral pressure switch could simplify circuit design and permit new applications by eliminating the need for external switches.
3. As the polymer composition can be manufactured without metal, it is possible to construct a wholly plastic electrochemical cell.

Pressure sensitive polymer composition can also be used without direct involvement in the cell chemistry by positioning the composition on external casings or non-reacting surfaces of electrodes. Switching of the polymer composition could be initiated by externally applied mechanical pressure such as finger pressure or spring pressure from within a battery compartment. This could form a switch for controlling external circuits including battery check circuits.

Other applications of the composition include:

Mechanical Transducers, both relative and absolute, for measuring pressure, load, displacement, torque, elongation, mass and volume change, acceleration, flow, vibration and other mechanically induced changes.

Current Flow Transducers.

Electric and Magnetic Field Transducers.

Electric and Magnetic Field Transducers.

Thermal Energy Transducers.

Magnetostrictive Devices.

Magnetoresistive Devices.

Magnetic Resonance Devices.

Detecting and Quantifying Localised Movement of Body Parts and Organs.

Detection and Generation of Sound Waves.

Relay Contacts and Junctions.

Electrical Conductors and Inductors for Microcomponents.

Temperature control

Screening of Electric and Magnetic Waves.

Current and Voltage Protection Devices.

Switching.

Power Control.

DETAILED DESCRIPTION OF THE INVENTION

EXAMPLE 1

Figure 1:
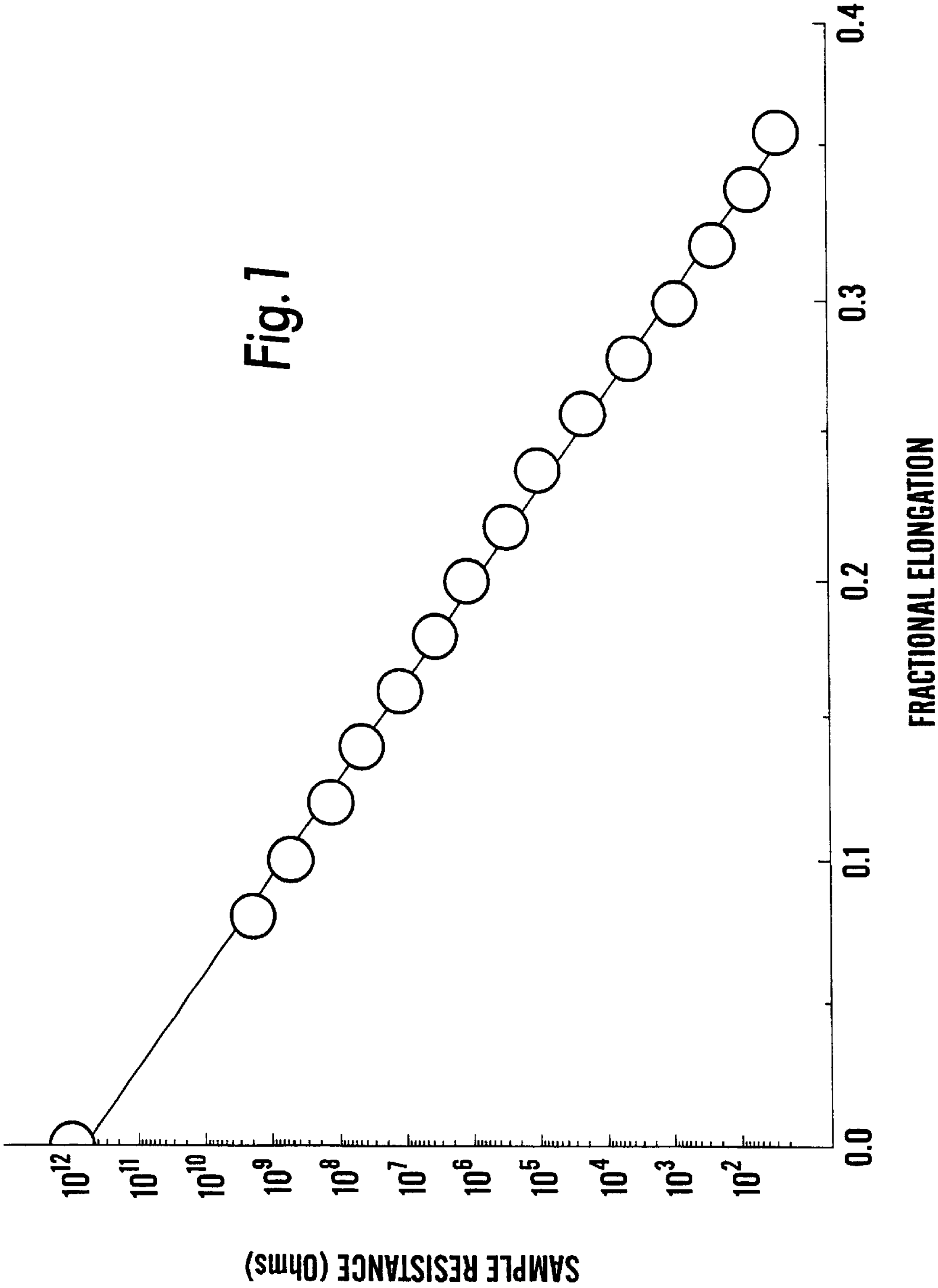
FIGS. 1 and 2 are graphs of resistance against fractional elongation and fractional compression respectively of the composition according to the invention.
Figure 2:
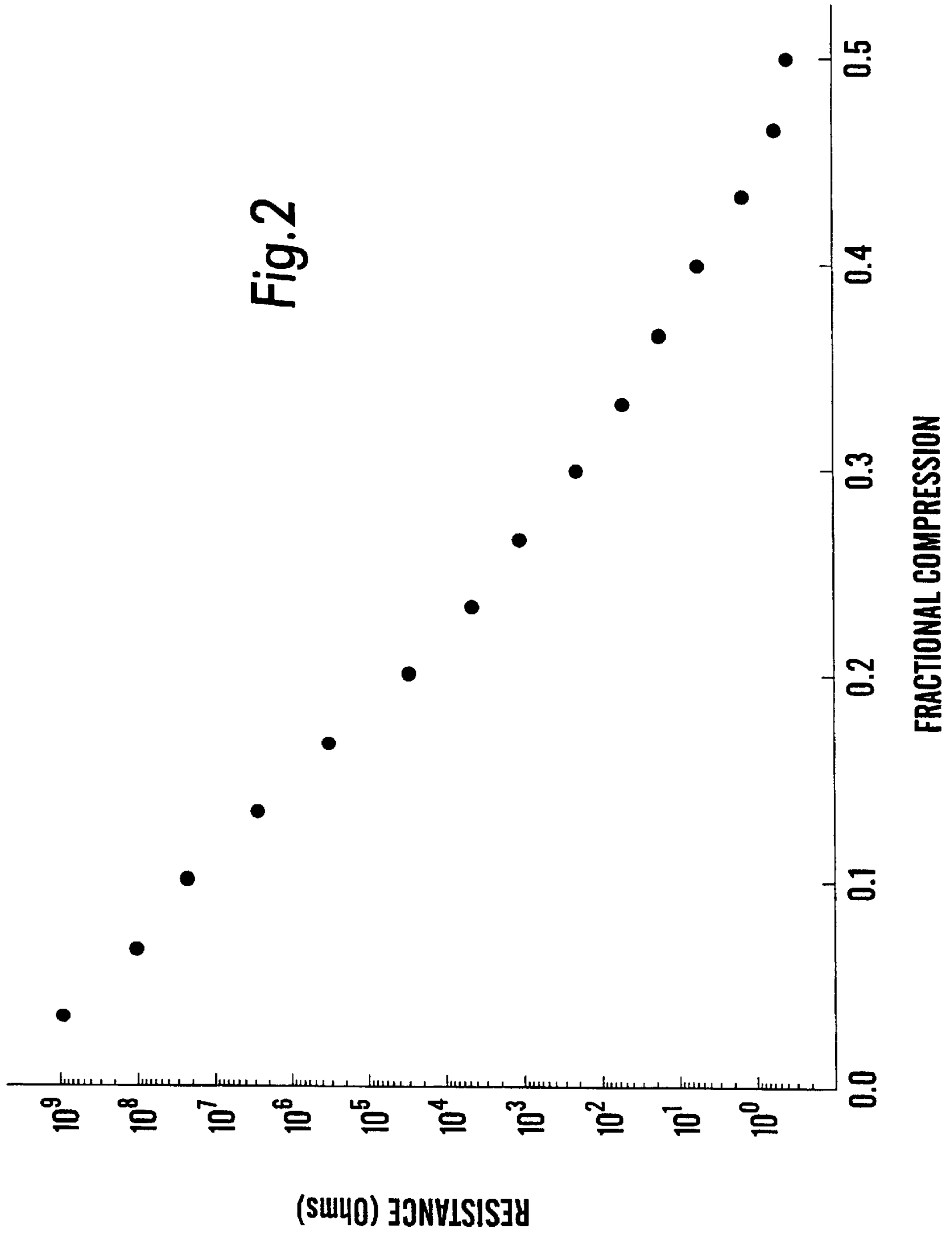
Figure 3:
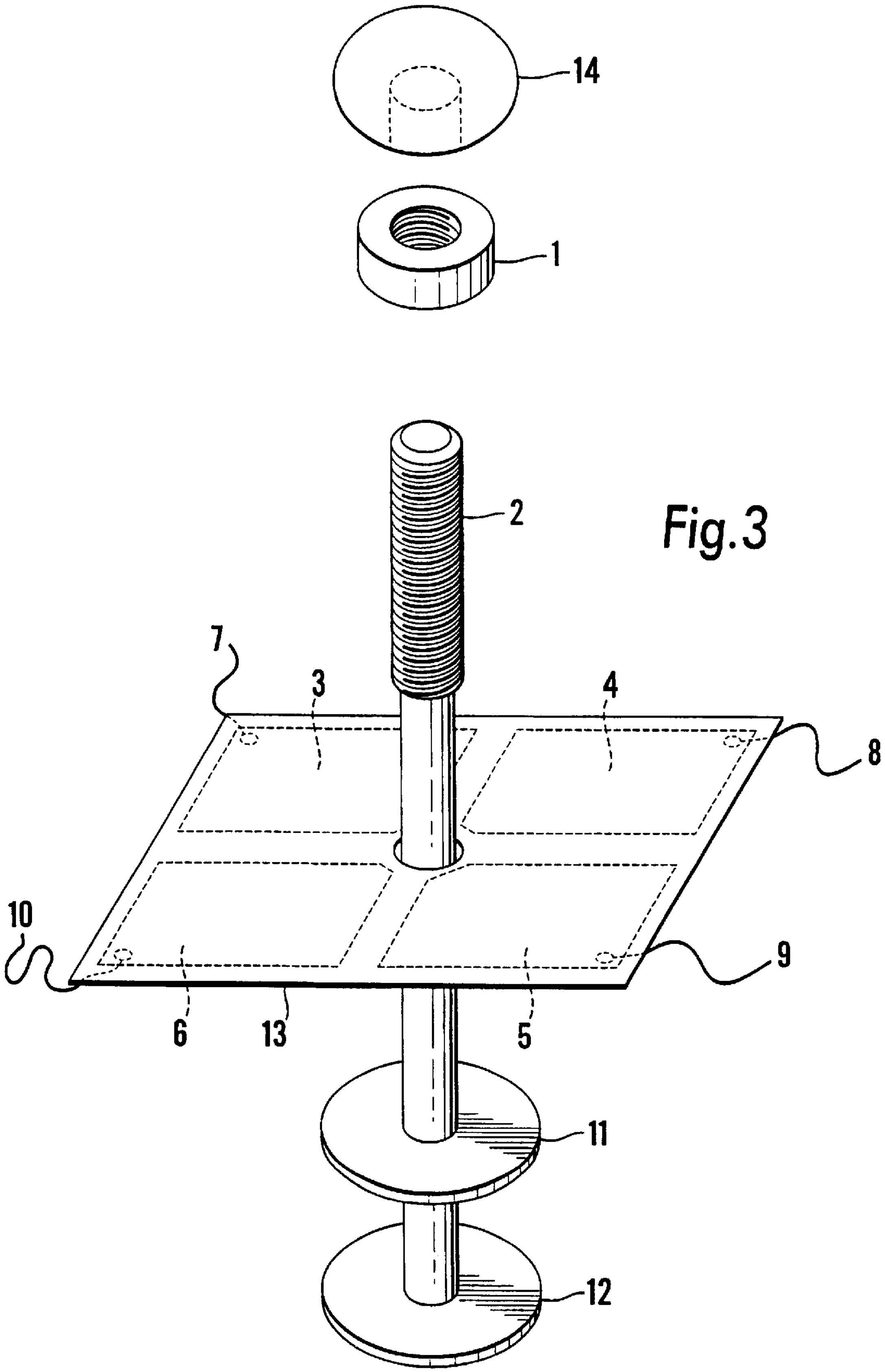
FIGS. 3 to 5 show alternative electric switches incorporating a composition according to the invention.
Figure 4:
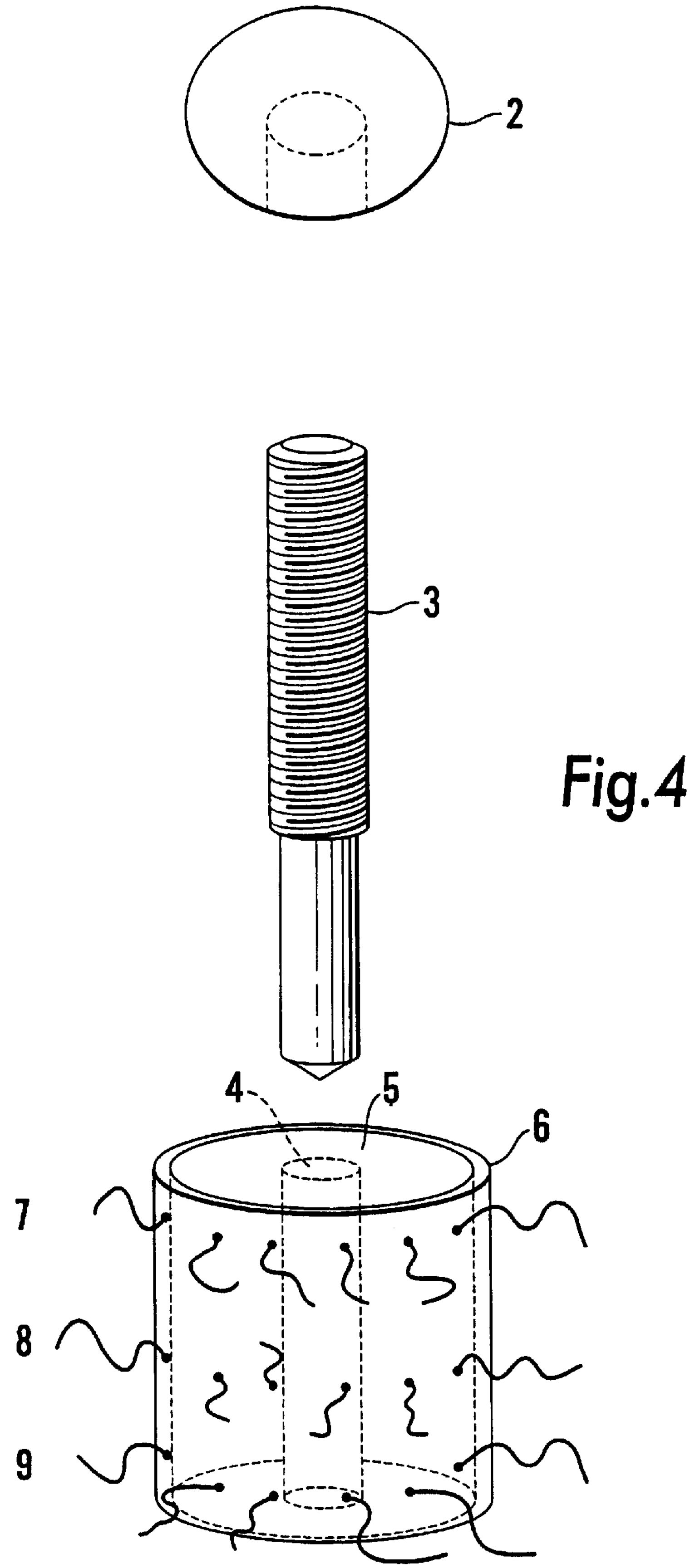
Figure 5:
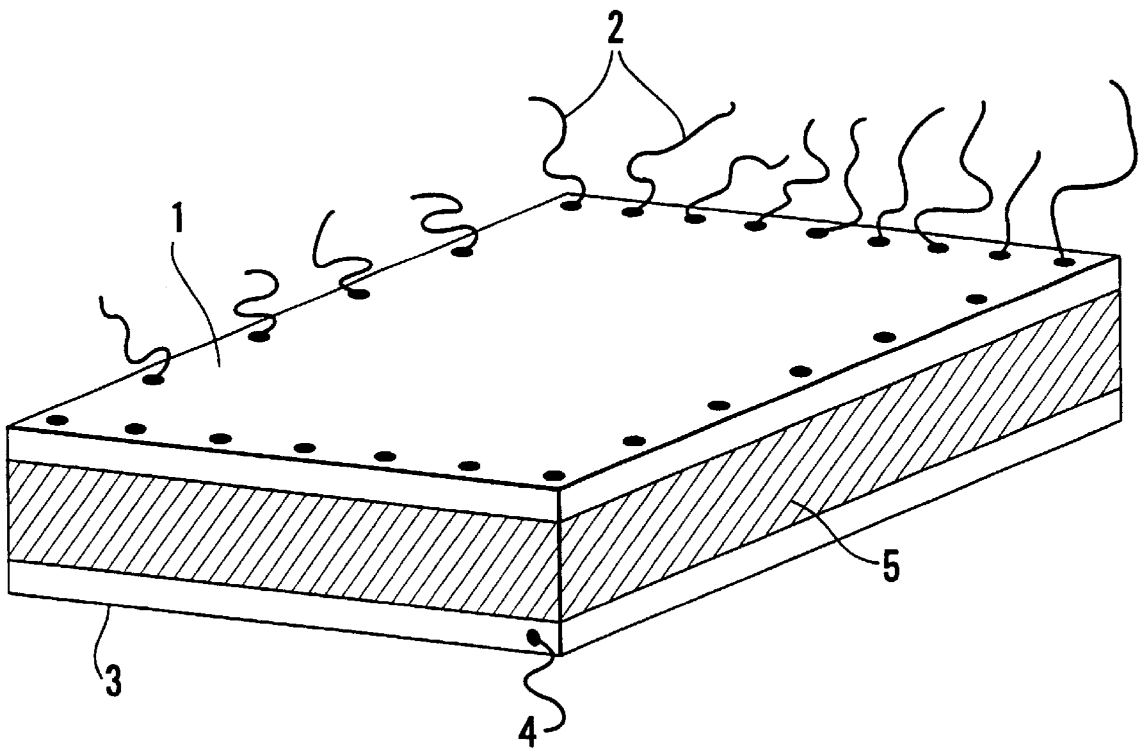

An example of a subject polymer composition using a conductive metal powder is given as follows:

Nickel powder—INCO 287 is mixed with Dow Corning 781 RTV silicone rubber encapsulant which, as supplied, contains as modifier sufficient fumed silica to allow the invention to the nickel with the silicone rubber in the approximate ratio 7:4 by volume and the resulting mix allowed to cure. The resulting conductive polymer composition gives the strain results shown in drawing 1 and the compression results shown in drawing 2.

This produces a flexible conductive polymer composition which displays a high resistance of approximately $10^{12}$ Ohms when in a quiescent state and which drops to a low resistance of approximately 20 Ohms when stretched to 1.4 times its quiescent state measurement. The result of stretching and compressing a sample of the polymer composition is shown graphically in drawings 1 and 2 attached. The data given in drawing 1 is for the pseudo steady state fitted with expression $R=5.541E+11xe^{(-66.43x)}$ where X is the fractional elongation. The data given in drawing 2 is for a 1.5 mm thick sample of the polymer composition and using aluminium electrodes 10×15 mm in dimension. Under pressure, this composition can have an electrical resistance around $10^{-1}$ Ohms and carry currents of 3 $Amps/cm^2$.

EXAMPLE 2

An example of a subject conductive polymer composition which is very sensitive to pressure and displays Positive Temperature Co-efficient (PTC) effects is given as follows:

Nickel powder—INCO 287 is mixed with Dow Corning 781 RTV silicone rubber in the ratio 11:4 by volume and the resulting mix allowed to cure. A sample of the mix 0.5 mm thick is supported between conductive plates 1 $cm^2$ in area and pressure is applied to the sample by way of the plates. The following table shows the resistance change as a result of the load applied:

| Load (grams) | Resistance (ohms) |
|---|---|
| 0 | $10^{12}$ |
| 1 | $10^{8}$ |
| 8 | $10^{6}$ |
| 50 | $10^{4}$ |
| 75 | $10^{2}$ |
| 180 | $10^{1}$ |
| 375 | $10^{0}$ |

This polymer composition also shows a marked PTC effect. If the conducting plates are loaded to 375 grams the composition will pass a current of 3 amps at voltages of up to 60 volts. If the current exceeds this limit, the PTC effect will occur and the composition will reduce its conduction of current to a very low level, effectively acting as a fuse. Because of the elastomeric properties of the encapsulant the composition will return to a conducting state without total removal of power, when the current flow returns to normal levels. This automatic resetting of conduction, and the ability to set the trip current rating of the polymer composition with externally applied pressure is possible with other metallic conductive fillers and combinations of fillers within the composition. Forces applied to the polymer composition alter its resistance and also control the start point at which the PTC effect occurs. By this means the composition provides both a way of altering an electric current up to a maximum value and automatically limiting that current to ensure that the maximum value is not exceeded.

EXAMPLE 3

An example of a subject conductive polymer composition having a high conduction in the quiescent state is given as follows:

Nickel powder—INCO 287 is mixed with Alfas Industries ALFASIL 1000 silicone RTV polymer containing fumed silica modifier, the powder to polymer ratio being, 11:4 by volume, and the resulting mix is cured at a temperature of 50° C. This mixture shrinks during polymerisation and when allowed to cure displays a conductivity of less than lKohm across a 2 mm thickness of the composition. This can be reduced to approximately 1 ohm if the composition is kept under pressure during the cure process. If an HTV based polymer is substituted for the RTV based polymer, heat and pressure can be used to effect a very rapid cure to the final conductive polymer composition. Useful PTC effects may be directly produced in these high-conduction polymer compositions by ohmic or other forms of heat energy without any further external application of force. The range of the PTC effect may be altered by the application of a force.

EXAMPLE 4

An example of a subject conductive polymer composition using a reduced oxide is given as follows:

A sample of titania $TiO^2$ powder was partially reduced in a hydrogen atmosphere by heating the powder in an electrical furnace at 1200° C. for 4 hours to form a phase which is predominantly made up of the phase $Ti^4O^7$ but including phases in the range TiOx where 1.55<x<1.95. The resulting phase was cooled and powdered. was mixed with RTV silicone adhesive (code 781, supplied by Dow Corning) in the approximate ratio of 7 parts of oxide to 4 parts of silicone. Mixing was performed by hand using a minimum of shear so as to distrivute the the powder throughout the adhesive phase. The mixture was then pressed to form a flat film 1 mm in section and left cure for 3 days. Once the polymer composition had set a 1 cm disc was cut from the cured sheet and its electrical properties tested by measuring the resistance changed with increasing mass loading. The mass loading was applied to one surface of the disc using a 2 mm conducting brass ball as an electrode. The results were as follows:

| Force (grams) | Resistance (ohms) |
|---|---|
| 0 | $10^{12}$ |
| 50 | $10^{7}$ |
| 70 | $10^{6}$ |
| 200 | $10^{3}$ |
| 1100 | $10^{1}$ |
| 2400 | $10^{0}$ |

EXAMPLE 5

An example of the use of the subject conductive polymer composition in a b 2/3axis switch is as follows: with reference to drawing 3, a threaded rod 2 has a contact plate 12 fixed to one end. This plate is electrically conductive and forms one pole of the switch. A conductive polymer composition washer 11 having similar diameter to the contact plate 12 is slid onto the rod 2 until it is in contact with plate 12. An insulated board 13 which has a number of conductive areas 3, 4, 5 and 6 on its lower face, is slid onto the rod to form the opposite poles of the switch and electrical contacts are made to the conductive areas at points 7, 8, 9 and 10. The assembly is clamped loosely together with the threaded collar 1 and operating knob 14 is screwed onto the top of the threaded rod 2 allowing hand leverage to be applied to the top of the rod 2 to operate the switch. With the insulated board 13 held firmly, leverage applied to the top of the rod 2 will appear as a pressure exerted on the conductive polymer composition between plate 12 and the conductive areas 3, 4, 5 and 6. As plate 12 is one pole of the switch, conduction will occur between it and the conductive areas 3, 4, 5 and 6 via the interstitial conductive polymer composition. The amount of conduction will be proportional to the pressure applied. The quadrate layout of the conductive areas 3, 4, 5 and 6 allows the resulting conduction pattern to be resolved to show in which axis the pressure is being applied.

EXAMPLE 6

An example of a full 3 axis switch using the subject conductive polymer composition is as follows:

with reference to drawing 4, a block of conductive polymer composition 5 is contained within an insulated cylinder . A plurality of electrical point contacts 7, 8, 9 etc surround and pass through the cylinder to make contact with the conductive block 5. A conductive metal rod 3 is bonded electrically and physically into the centre of the conductive block 5 to form an operating lever and one pole of the switch. With cylinder 6 firmly clamped, any forces imparted through the conductive metal rod 3 will result in changes of resistance within the conductive polymer composition between the central conductive rod 3 and the surrounding contacts 7, 8, 9 etc. The change of resistance will be proportional to the forces applied and the direction of the forces is resolvable through the plurality of contacts 7, 8 9 etc. This switch is capable of resolving forces from X, Y and Z axes as well as compound and twisting forces.

EXAMPLE 7

An example of a planar switch using the subject conductive polymer composition is as follows:

with reference to drawing 5, a conductive layer 3 forms one plate 4 of the switch and has a conductive polymer composition layer 5 electrically bonded to one face. A resistive layer 1 is laid on top of the conductive layer 5 in intimate electrical contact. The resistive layer 1 is chosen to have a usable and a stable electrical resistivity regardless of pressure and can be a carbon loaded polyethylene or any flexible resistive membrane which shows little or no piezoresistive change. A plurality of electrical contact points 2 are placed around the periphery of the resistive layer 1 and their output monitored. Any point or area force applied on top of the resistive layer 1 will result in the conductive layer 5 reducing resistance in proportion to the applied force. The resulting conductive paths from layer 3 through layer 5 and layer 1 can be resolved from the contact points 2 to provide a pressure map of the shape and size of the applied force on the surface of resistive layer 1.

What is claimed:

1. A polymer composition which is elastically deformable from a quiescent state and comprises at least one electrically conductive filler selected from the group consisting of powder-form metallic elements and alloys, electrically conductive oxides of said elements and alloys, and mixtures thereof, mixed with a non-conductive elastomer, wherein the volumetric ratio of filler to elastomer within the composition being at least 0.1:1, the filler being mixed with the elastomer in a controlled manner whereby the filler is dispersed within and encapsulated by the elastomer and remains structurally intact, and the voids present in the starting conductive filler powder become infilled with elastomer during mixing, and particles of conductive filler become set in close proximity during curing of the elastomer, the nature and concentration of the filler being such that the electrical resistivity of the composition is variable in response to compression or extension forces and decreases from a given value in the quiescent state towards a value substantially equal to that of the conductor bridges of the filler when subjected to either compression or extension forces, the composition further comprising a modifier which, on release of said forces, accelerates the elastic return of the composition to its quiescent state.

2. A polymer composition which is elastically deformable from a quiescent state and comprises at least one electrically conductive filler selected from the group consisting of powder-form metallic elements and alloys, electrically conductive oxides of said elements and alloys, and mixtures thereof, mixed with a non-conductive elastomer, wherein the volumetric ratio of filler to elastomer within the composition being at least 0.1:1, the filler being mixed with the elastomer in a controlled mixing regime avoiding destructive shear forces whereby the filler is dispersed within and encapsulated by the elastomer and the voids present in the starting conductive filler powder become infilled with elastomer during mixing, and particles of conductive filler become set in close proximity during curing of the elastomer, the nature and concentration of the filler being such that the electrical resistivity of the composition is variable in response to compression or extension forces and decreases from a given value in the quiescent state towards a value substantially equal to that of the conductor bridges of the filler when subjected to either compression or extension forces, the composition further comprising a modifier which, on release of said forces, accelerates the elastic return of the composition to its quiescent state.

3. A composition as claimed in claim 1 wherein the conductive filler is present as agglomerated and individual conductive filler particles coated with the elastomer encapsulant.

4. A composition as claimed in claim 2 wherein the conductive filler is present as agglomerated and individual conductive filler particles coated with the elastomer encapsulant.

5. A composition as claimed in claim 1 wherein the elastomer comprises silicone rubber.

6. A composition as claimed in claim 2 wherein the elastomer comprises silicone rubber.

7. A composition as claimed in claim 1 wherein the filler is selected from the group consisting of metallic nickel, reduced titania, metallic zirconium, metallic copper and metallic titanium.

8. A composition as claimed in claim 2 wherein the filler is selected from the group consisting of metallic nickel, reduced titania, metallic zirconium, metallic copper and metallic titanium.

9. A composition as claimed in claim 1 wherein the elastomer is made from room-temperature vulcanisable (RTV) silicone polymer or high temperature vulcanisable (HTV) silicone polymer.

10. A composition as claimed in claim 2 wherein the elastomer is made from room-temperature vulcanisable (RTV) silicone polymer or high temperature vulcanisable (HTV) silicone polymer.

11. A composition as claimed in claim 1 wherein the modifier comprises fumed silica.

12. A composition as claimed in claim 2 wherein the modifier comprises fumed silica.

13. A process for making a composition as claimed in claim 1 wherein the components thereof are mixed in a controlled mixing regime avoiding destructive shear forces.

14. A process for making a composition as claimed in claim 2 wherein the components thereof are mixed in a controlled mixing regime avoiding destructive shear forces.

15. An electrical device embodying an electrical conductor made from a composition as claimed in claim 1, in combination with means to stress the conductor to desired level of conductivity, the device comprising a switch, an electrochemical cell at least one electrode of which embodies the conductor, or a PTC device in which the composition shows a positive temperature coefficient of resistance.

16. An electrical device embodying an electrical conductor made from a composition as claimed in claim 2, in combination with means to stress the conductor to desired level of conductivity, the device comprising a switch, an electrochemical cell at least one electrode of which embodies the conductor, or a PTC device in which the composition shows a positive temperature coefficient of resistance.

17. A composition as claimed in claim 1 wherein the conductive filler comprises a three-dimensional chain-like network of spiky beads having a large surface area.

18. A composition as claimed in claim 1 capable of forming at a certain level of distortion a number of particle-to-particle open circuit tracks resulting in a conductivity tending towards that of the bulk metal.

19. An electrical device comprising a polymer composition as claimed in claim 1 and further comprising stressing means for stressing the conductor to a level of distortion forming particle-to-particle open circuit tracks resulting in a conductivity tending towards that of the bulk metal of the particles.

20. A composition as claimed in claim 2 wherein the conductive filler comprises a three-dimensional chain-like network of spiky beads having a large surface area.

21. A composition as claimed in claim 2 capable of forming at a certain level of distortion a number of particle-to-particle open circuit tracks resulting in a conductivity tending towards that of the bulk metal.

22. An electrical device comprising a polymer composition as claimed in claim 2 and further comprising stressing means for stressing the conductor to a level of distortion forming particle-to-particle open circuit tracks resulting in a conductivity tending towards that of the bulk metal of the particles.

23. A composition as claimed in claim 1 wherein the conductive filler is filamentary.

24. A composition as claimed in claim 2 wherein the conductive filler is filamentary.

* * * * *